May 12, 1959   W. B. ZELINA   2,886,764
UNIDIRECTIONAL VOLTAGE MULTIPLIER AND DIVIDER
Filed April 19, 1956

Inventor:
William B. Zelina,
by David P. Ogden
His Attorney.

United States Patent Office 2,886,764
Patented May 12, 1959

2,886,764

UNIDIRECTIONAL VOLTAGE MULTIPLIER AND DIVIDER

William B. Zelina, Erie, Pa., assignor to General Electric Company, a corporation of New York Application April 19, 1956, Serial No. 579,217

17 Claims. (Cl. 322—25)

My invention relates to a unidirectional voltage multiplying and/or dividing networks, more particularly to networks delivering an output voltage representing the product and/or quotient of variable unidirectional voltages applied thereto.

This invention is an improvement of my co-pending application Serial Number 505,715, filed May 3, 1955, which is assigned to the assignee of the present application.

For many years industry has been searching for a rugged and reliable network completely free of moving parts or rotating machines that will yield a product or quotient of unidirectional electrical quantities and that may be used on heavy machines subject to damaging vibrations. Although devices that perform multiplication have been built using vibrating relays or vacuum tubes, the complexity, maintenance and fragility of such devices has severely limited their use under adverse conditions. A network of the type contemplated by my invention can serve as a unidirectional wattmeter using an averaging voltmeter as an indicator.

A wattage signal derived from such a network will find direct application in excitation systems of direct current motors and generators used on apparatus such as a locomotive which is subject to severe vibrations, shocks, climatic variations. Also, such a signal will regulate the electrical horsepower load of any prime movers which are subject to stalling under overload conditions. Another application is to use my invention as a control for spot or projection welding. Thus, it will be feasible to regulate the volts and amperes delivered to the work piece to provide a constant preset rate at which energy is delivered. With the unidirectional multiplier and a timer controlling the duration of the weld, a fixed amount of energy, independent of surface conditions, could be delivered to the work piece for each weld.

Therefore, an object of my invention is to provide a simple, rugged, reliable, accurate and low cost network for multiplying and/or dividing unidirectional voltages.

A further object is to provide a simple and reliable network free of moving parts which will deliver an output indicative of the product of two applied electric signals.

Another object of my invention is to provide a simple and reliable horsepower limit regulator for a unidirectional generator or motor.

In carrying on my invention in one form, when used as a multiplier, one of the input voltages is utilized to modify the transfer action of a self-excited high frequency relaxation oscillator network having its feedback path completed through mutual coupling of windings of a saturable transformer. The rectangular wave output of this oscillator is then applied to a rectifier network which is excited from a second input voltage, and the resultant signal is proportional to the product of the input quantities. In the above operation, the oscillator is connected with a constant unidirectional voltage. When operated as a divider, the constant unidirectional voltage is replaced by a signal representing the divisor, a signal corresponding to the dividend is applied to one of the previous input terminals, and the other of the multiplier input terminals is excited from a reference voltage. When used as a regulator, one input voltage may be proportional to load current and the other input voltage is proportional to line voltage with the resultant voltage controlling fuel rate of the prime mover or the excitation of the generator.

Further objects of my invention will become apparent and my invention will be better understood from the following description referring to the accompanying drawings. The features of novelty which characterize my invention will be pointed out with particularity in the claims annexed to and forming part of this specification.

In the drawings, Fig. 1 is a schematic circuit showing one embodiment of my invention;

Figure 1:
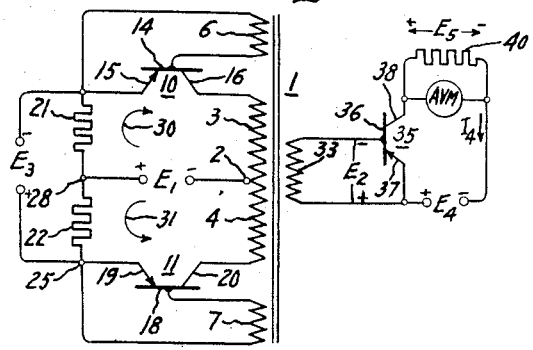

Referring now to the drawings, in Fig. 1, I have shown a saturable transformer 1 having a primary winding that has a center tap 2 to provide two equal primary winding portions 3 and 4 each having N turns. On the same core I have connected similar tertiary windings 6 and 7 each having a number of turns sufficient to provide a relatively low switching voltage. Two similar pnp junction transistors 10 and 11 are connected to be turned on alternately by these switching voltages. The transistor 10 has a base electrode 14, an emitter electrode 15 and a collector electrode 16. The similar transistor 11 has a base electrode 18, an emitter electrode 19 and a collector electrode 20. The collector electrodes 16 and 20 are connected to provide current to opposite ends of the primary windings portions 3 and 4 respectively. The emitter electrode 15 and the base electrode 14 are connected across the tertiary winding 6 to be turned on by a predetermined voltage therein, and the emitter electrode 19 and the base electrode 18 are connected across the tertiary winding 7 to be turned on thereby. Thus, a changing flux in the transformer 1 will turn on one and turn off the other of the transistors.

A voltage divider having equal resistor sections 21 and 22 is connected between the junctions 24 and 25 which are respectively connected in circuit with the emitter electrodes 15 and 19. A voltage $E_1$ is connected between the center tap 2 of the transformer 1 and a center tap 28 of the voltage divider 21—22. Thus, I have provided two loop circuits 30 and 31 comprising the voltage supply $E_1$, the resistor section 21, the transistor 10 and the primary winding portion 3; and the voltage supply $E_1$, the resistor section 22, the transistor 11, and the primary winding portion 4 respectively.

Oscillator operation

Figure 2:
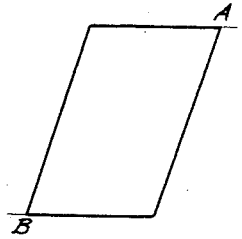
Fig. 2 shows the flux excursion of the saturable transformer shown in Fig. 1.

Assume that $E_1$ is a constant unidirectional voltage of a polarity which will cause current to flow through the voltage divider, the transistors and the primary windings, and also assume that the network conditions predominately favor the initiation of conduction in the transistor 10. The tertiary winding 6 is coupled magnetically to the primary winding portion 3 with a sense enhancing the conductivity of the transistor 10 and the tertiary winding 7 is coupled magnetically to the primary winding portion 3 with a sense inhibiting current conduction in the transistor 11 at this time. A current will continue to flow through the loop circuit 30 including the transistor 10 until the transformer 1 is saturated. During its conductive periods, the transistor 10 does not significantly affect the magnitude of the loop current because of its low integral impedance. The circuit parameters of the voltage divider 21—22 and the primary winding 3—4 are chosen to have respective impedances so that the magnitude of this current in the loop circuit 30 is controlled primarily by the inductance of the primary winding portion 3. Thus, the current is continually increasing and there are continual voltages provided by the tertiary windings 6 and 7 until the transformer is saturated (point A, Fig. 2), at which time the tertiary windings 6 and 7 will no longer bias the transistors 10 and 11. When the transformer core is saturated by this current, the drive voltage produced by flux changes in the winding 6 will no longer bias the transistor 10 to turn it on and the increased impedance of the transistor 10 now causes a reduction of current flow in the loop circuit 30.

This increased impedance of the transistor 10 in the loop circuit 30 reduces the current in the winding 3 to reverse the flux excursion of the transformer 1, further increasing the impedance of the transistor 10. At this time, the tertiary winding 7 is energized by this change to render the transistor 11 conducting and reduce its impedance. $E_1$ now causes current to flow in the loop circuit 31 energizing the primary winding portion 4 which is coupled magnetically to the tertiary windings 6 and 7 to produce voltages therein which respectively inhibit conduction in the transistor 10 and enhance conduction in the transistor 11. Because of the dominating inductive impedance of the primary windings portions 3 and 4, this current again is continually increasing until the transformer 1 is driven to saturation on the opposite limb (point B, Fig. 2) and the cycle is repeated. This results in a relaxation oscillator which produces a rectangular wave voltage $E_2$ (Fig. 3) in the secondary winding 33.

Figure 3A:
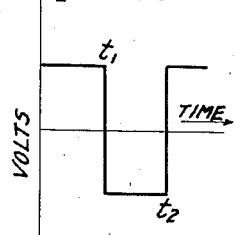
Fig. 3 (a–b) shows rectangular wave shapes produced by the relaxation oscillator shown in Fig. 1.
Figure 3B:
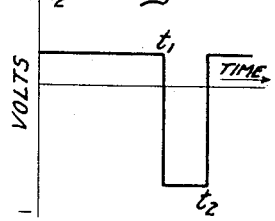

Figs. 3, 4 and 5 show curves of this wave shape with the ordinate scale in volts and the abscissa scale in time. The rectangular wave shape of course depends on the magnitude of the input voltages as well as the inductance and permeability of the transformer 1. It should be noted that the area of the positive portion of the rectangular wave in Figs. 3a and 3b is equal to the area of the negative portion. It is apparent that the volt-second product required to drive the core from one saturation limb (A) to another (B) is constant and dependent on the saturation flux density of the iron and the effective cross-sectional area of the core of the transformer 1. With this volt-second product of each half cycle equal to a constant, depending on the total change in flux of the transformer core (Fig. 2) between positive limb (point A) and negative limb (point B), the average unidirectional content of the rectangular wave shape is zero. For the mathematical analysis shown below, I shall designate this constant volt-second quantity as Y.

Referring again to Fig. 1, in order to regulate the relative half cycle time durations according to my invention, a signal voltage $E_3$ is connected to decrease by $E_3/2$ the voltage applied to the primary winding portion 3 and to increase by $E_3/2$ the voltage applied to the primary winding 4 by causing a voltage drop across the voltage divider 21—22 which is respectively subtracted from and added to $E_1$. The terminals 24 and 25 are connected across the voltage divider 21—22 to provide a ready means for applying the variable unidirectional voltage $E_3$. This results in an increase of the time required to drive the transformer flux to point A when the transistor 10 is conducting and a reduction in the time required to drive the flux to point B when the transistor 11 is conducting as shown in Fig. 3b.

It will also be noted from Fig. 3a, representing an oscillation where only $E_1$ is applied, that the increment of time necessary to saturate the transformer 1 in the positive direction is equal to the increment of time necessary to saturate the transformer in the negative direction. Since $E_3$ is zero and only $E_1$ controls the magnitude of the positive and negative voltages produced in the secondary, these voltages are equal in magnitude in the preferred arrangement where all of the components in the two loop circuits 30 and 31 are equal. I shall designate the increment of time necessary for the positive half cycle to saturate the core of the transformer 1 as $t_1$ and the time necessary for the negative half cycle as $t_2$. Using the symbols $E'_2$ and $E''_2$ for the positive and negative values respectively, it is obvious from the above that the volt-second area $E'_2 t_1$ is equal in magnitude to $E''_2 t_2$ in both Figs. 3a and 3b.

In order to further explain the relationships of this network, I will now show a mathematical analysis. Using the symbol $V_1$ equal to the voltage in the loop circuit 30 and $V_2$ equal to the voltage in the loop circuit 31, and assuming a negligible voltage drop across the voltage divider 21—22, and the conducting transistors 10 and 11, I am able to show the following mathematical relationships:

(1) $\qquad V_1 = NY/t_1$
(2) $\qquad V_2 = NY/t_2$
(3) $\qquad V_1 = E_1 - E_3/2$
(4) $\qquad V_2 = E_1 + E_3/2$ From the solution of Equations 1 through 4 to find the saturating or half cycle time, one obtains:

(5) $\qquad t_1 = 2NY/(2E_1 - E_3)$
(6) $\qquad t_2 = 2NY/(2E_1 + E_3)$

Since N and Y are dependent on the physical structure of the windings and core of the transformer respectively, it is easily seen that for a particular network with only the signal $E_1$, $t_1$ equals $t_2$ as shown in Equations 5 and 6. However, as $E_3$ increases from zero, the quantity $t_1$ is increased proportional to the decrease in the magnitude of $E'_2$ and $t_2$ is decreased proportional to the increase in the magnitude of $E''_2$. It becomes apparent from Equations 5 and 6 that with N and Y constant, increasing $E_1$ decreases $t_1$ and $t_2$.

It should be noted that the frequency F of this oscillator is inversely proportional to the total time of a complete cycle which may be shown as:

(7) $\qquad F = 1/t_1 + t_2$

Substituting Equations 5 and 6 shows that:

(8) $\qquad F = (4E_1^2 - E_3^2)/8NYE_1$

Thus, it is easily seen that the frequency of the oscillator can be controlled very easily by varying the physical values of N and Y, depending on the values of $E_1$ and $E_3$ that are available as stimuli. Thus, my invention may be made to match a wide range of signal voltages.

It also becomes apparent that with winding portions 3 and 4 having N turns and winding 33 having N' turns that:

(9) $\qquad E'_2 = (E_1 - E_3/2) N'/N$
(10) $\qquad E''_2 = (E_1 + E_3/2) N'/N$

In order to use this rectangular wave voltage $E_2$ produced in the winding 33 and shown in Figs. 3a and 3b, in my invention I have connected the transistor 35 to be turned on and off by this voltage. The transistor 35 is similar to transistors 10 and 11, having a base electrode 36 and an emitter electrode 37 connected to be energized by a negative voltage $E''_2$ in the winding 33 to provide substantially no conduction between the emitter electrode 37 and a collector electrode 38. I prefer that the operation of the oscillator be such that the voltage $E'_2$ is always great enough to turn on the transistor 35. Thus, the impedance across emitter and collector electrodes of the transistor 35 may be designed to be negligible during positive half cycles of $E_2$ compared to the other components connected in circuit therewith. In Fig. 1 a load resistor 40 and a unidirectional voltage $E_4$ are serially connected between the collector electrode 38 and the emitter electrode 37 to cause a current $I_4$ to flow through the resistor 40 when the transistor 35 is turned on by the voltage $E'_2$.

Figure 4A:
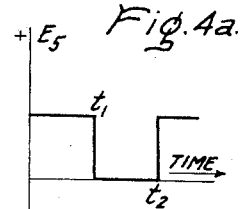
Fig. 4 (a–b) shows the wave shapes produced across the averaging voltmeter of the circuit shown in Fig. 1.
Figure 5A:
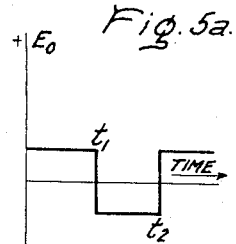
Fig. 5 (a–b) shows the wave shape produced across the voltmeter of the circuit shown in Fig. 6.
Figure 4B:
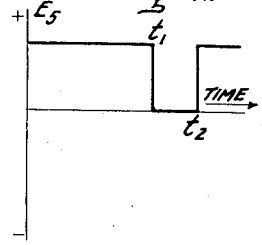

During the negative half cycle of the oscillator no current $I_4$ will flow because the transistor 35 is turned off, in other words, biased to cutoff by $E''_2$. The resulting rectangular wave shape is shown in Figs. 4a and 4b. While the area (or average current) of the positive and negative half cycles is equal to zero in both Figs. 3a and 3b, the area (or average current) remaining in Figs. 4a and 4b is not equal to zero because during the conductive period the current is proportional to $E_4$ and during the time $t_2$ all current is blocked by the transistor 35.

In order to interpret the voltage drop caused by current $I_4$ in the resistor 40, I prefer to connect an averaging voltmeter, Fig. 1, thereacross to sense and integrate the resultant voltage $E_5$ (Fig. 4). The average voltage $E_5$ is equal to the volts during conduction, times the time of conduction per cycle times the frequency and may be shown mathematically as:

(11) $$E_5 = E_4 t_1 F$$

Substituting the properties for $t_1$ and F from Equations 5 and 8, one obtains:

(12) $$E_5 = E_4 2NY(4E_1^2 - E_3^2)/8NYE_1(2E_1 - E_3)$$

which reduces to

(13) $$E_5 = E_4/2 + E_3 E_4/4E_1$$

However, the value of $E_5$, although useful in many applications, is not a true indication of the multiplication of $E_3$ and $E_4$. To provide a simple multiplier and divider, it is necessary to remove the voltage $E_4/2$ from Equation 13.

Figure 5B:
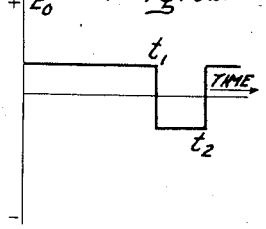
Figures 6, 7:
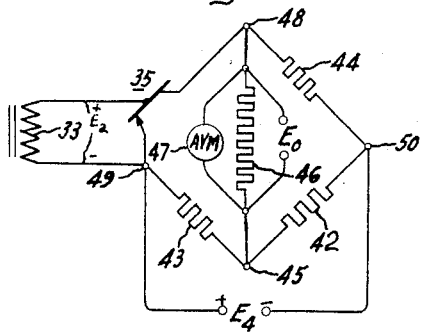
Fig. 6 is a modification of the circuit shown in Fig. 1.
Fig. 7 is a schematic circuit showing two applications of my invention.

In Fig. 6, I have shown a simple means of subtracting the $E_4/2$ wherein a simple voltage divider comprising the equal resistors 42 and 43 is connected across $E_4$. By making resistor 42 equal to the resistor 43, an $E_4/2$ voltage tap 45 is provided. A resistor 44, the transistor 35 and these resistors 42 and 43 are connected to form a bridge circuit with the resistors 42, 43 and 44 being chosen to have a small impedance compared to the impedance of a load dropping resistor 46. $E_4$ is applied across one diagonal of this Wheatstone bridge and the dropping resistor 46 and the averaging voltmeter 47 are connected across the other diagonal. When the transistor 35 is conducting, the $E_4$ appears across the resistor 44 and when the transistor 35 is turned off $E_4$ appears across the transistor 35. Thus, the voltage at the junction 48 is alternately equal to the voltage at the junction 49 and the junction 50 while the voltage at the center tap 45 remains at $E_4/2$. This arrangement effectively lowers the entire rectangular wave shape to the position shown in Figs. 5a and 5b. Since $t_1 = t_2$ at any time $E_3$ is zero (Fig. 5a), the averaging voltmeter 47 will give an indication of zero. In Fig. 5b, $t_1$ does not equal $t_2$ and a signal is indicated by the averaging voltmeter 47.

Thus, it is easily seen that $E_4/2$ is cancelled out and the magnitude of the average voltage $E_0$ indicated may be shown as:

(14) $$E_0 = E_3 E_4/4E_1$$

The network described above illustrates a preferred way of removing the $E_4/2$ component from the output of transistor 35. If the derived signal is to be used to control a magnetic amplifier, the $E_4/2$ component could be removed by providing an extra signal winding into which $E_4/2$ could be fed. If this multiplier is to be used in computer work, it would be a simple task to remove $E_4/2$.

The characteristics of the unidirectional voltages $E_1$, $E_3$ and $E_4$ are important to my invention. It is obvious from Equation 14 that this network may be used as a multiplier if $E_1$ is provided from a constant voltage source such as a battery. However, if it is desired to use my invention as a divider, $E_1$ is used as a variable unidirectional stimuli or signal.

Also, it should be noted from Equation 5 that $t_1$ approaches infinity when $E_3$ approaches $2E_1$. I prefer to use a value of $E_4$ which is substantially less than would be required to break down the back voltage of the transistor 35 or cause excessive currents to flow in the transistor 35. Similar safeguards must be used in the selections of $E_1$ and $E_3$ to protect the transistors 10 and 11.

The polarity of the applied voltages $E_1$, $E_2$, $E_3$ and $E_4$ is also important. Reversal of $E_1$ or $E_4$ will prevent current flow in the transistors connected in circuit therewith. Reversal of $E_2$ or $E_3$ will invert the voltage $E_0$ and thus reverse the polarity of the indication of the averaging voltmeter.

In Fig. 7, I have shown a simple circuit illustrating one method of connecting my invention to a unidirectional generator 55 to limit the power output to a load 56. The signal voltage $E_3$ may be tapped from the circuit of the power lines 58 and 59, and the signal voltage $E_4$ may be derived from a shunt 60 in line 59. In some applications, I would prefer to use a current measuring reactor in place of the shunt 59. The output voltage $E_0$ is connected to energize a differential field winding 62 which produces a flux to reduce the field produced in a main excitation winding 63, and thus limit the generator excitation and power output. The voltages $E_3$, $E_4$ and $E_0$ are connected to the network of my invention shown in Figs. 1 and 6.

In order to provide a reference voltage to prevent energization of the winding 62, below a predetermined power output of the generator 55, I have provided a constant voltage impedance circuit which will pass a signal greater than a predetermined voltage consisting of a rectifier 65, and a constant voltage source or battery 66. In some applications the constant voltage impedance circuit may be effected by using a silicon diode operated in its Zener breakdown region as defined in my co-pending application, Serial Number 579,193, filed April 19, 1956 which is assigned to the assignee of this application. The constant voltage impedance may be omitted and the winding 62 instead may be energized by a signal from a magnetic amplifier, with $E_0$ controlling the current flow of the magnetic amplifier through some reference network as discussed above. Circuits for controlling magnetic amplifiers in this manner are well known and are not a portion of this invention. One system for controlling a magnetic amplifier in this manner is described in my co-pending application, Serial Number 468,211, filed November 12, 1954, and assigned to the assignee of this application.

Regardless of the means of connecting the voltage $E_0$ to control the excitation of the winding 62, it is readily apparent that when the signal $E_0$ reaches a predetermined value, the flux from the winding 62 will reduce the excitation of the generator 55 and thus limit its wattage or horsepower output. This use, of course, has many applications, two of which may be illustrated by Fig. 7.

In a most obvious use, it may be necessary to limit the output of the generator 55 to prevent stalling of a prime mover having maximum power rating such as a diesel engine 70. Since optimum power output of a diesel engine is at a predetermined speed, it may be desirable to regulate the setting of the constant voltage impedance circuit from a speed signal from the diesel engine 70. Such regulation may be accomplished by connecting a voltage divider (not shown) in circuit with the battery 66 and varying the tap setting in response to the speed signal from the diesel engine 70. Another means of regulating the output is to have the voltage $E_1$ connected to the speed sensing device.

Also, it may be desirable to limit the power used by the load 56. One such case would be in a continuous welding operation where a predetermined wattage per unit time would provide the best weld. Assuming that the prime mover 70 and the generator 55 were of sufficient capacity to provide the required power, it is a simple matter with my invention, when connected in the circuit shown, to limit the power used by the load to a required amount regardless of individual variation between the current and voltage of the system. By moving the stock to be welded at a constant speed, it is obvious that I could provide a predetermined wattage per inch of weld. By regulating the time of contact in one spot the wattage per weld in spot welding may be readily controlled.

While I have shown and described particular embodiments of my invention and a few basic uses thereof, modifications will occur to those skilled in the art. I intend by the appended claims to cover all such modifications as fall within the true spirit and scope of my invention.

What I claim as new and desire to secure by Letters Patent of the United States is:

1. A multiplier comprising a rectangular wave oscillator having an alternating output voltage signal, means connecting a unidirectional signal for modifying the transfer action of said oscillator to change the ratio of the time duration of the positive output voltage to the time duration of the negative output voltage of said oscillator, and other means connecting a second unidirectional signal to said oscillator to cause current flow from said second unidirectional signal only during the periods when the output of said oscillator is of one polarity.

2. A multiplier comprising a rectangular wave oscillator having an alternating output voltage signal, first means connecting a first unidirectional signal for modifying the transfer action of said oscillator to change the ratio of the time duration of the positive output voltage to the time duration of the negative output voltage of said oscillator, second means connecting a second unidirectional signal to said oscillator to cause current flow from said second unidirectional signal only during the periods when the output of said oscillator is of one polarity, means connected in circuit with said second means for removing a portion of said second signal equal to one half the value thereof, and means for sensing and integrating the resulting voltage.

3. A multiplier comprising a rectangular wave oscillator having an integrated output voltage equal to zero, first means connecting a first unidirectional signal to said oscillator for changing the ratio of the time duration of the positive half cycle to the time duration of the negative half cycle of said output voltage, a switch means connected to said oscillator for allowing current flow therein when said output voltage is positive with respect thereto, second means connecting a second unidirectional signal to said switch means to cause current flow from said second unidirectional signal through said switch means, means for removing a portion of said second signal equal to one-half the value thereof, and means connected in circuit with said switch means and said second signal for sensing and integrating the resulting signal.

4. A multiplier comprising a rectangular wave oscillator having an integrated output voltage equal to zero, first means connecting a first unidirectional signal $E_3$ to said oscillator for changing the ratio of the time duration of the positive output voltage to the time duration of the negative output voltage, sensing means connecting a second unidirectional signal $E_4$ to said oscillator allowing current flow equal to $E_4$ only during the periods when the output of said oscillator is of one polarity, means connected in circuit with said first means for removing a portion of said signal equal to one half the value thereof, and an averaging voltmeter connected in circuit with said signal $E_4$ for sensing and integrating the resulting signal whereby a signal proportional to the product $E_3E_4$ is obtained.

5. A multiplier comprising a rectangular wave oscillator having an integrated output voltage equal to zero, first means connecting a first unidirectional signal to said oscillator for changing the ratio of the time duration of the positive half cycles to the time duration of the negative half cycles of said output voltage, a transistor having its base and emitter electrodes connected to said output voltage of said oscillator for allowing current flow through said transistor during said positive half cycles of said output voltage, second means connecting a second unidirectional signal to said switch means to cause current flow from said second unidirectional signal through said switch means, means connected in circuit with said second means for removing a portion of said second signal equal to one-half the value thereof, and means connected in circuit with said switch means and said second signal for sensing and integrating the resulting signal whereby a composite signal proportional to the product of said first and said second unidirectional signals is obtained.

6. In a network delivering an output indication which is a joint function of two input stimuli, a rectangular wave generator developing an electric wave characterized by the absence of any substantial unidirectional component, means responsive to one of said input stimuli for modifying the characteristics of the rectangular output wave of said generator, variable impedance means connected in circuit with the output of said rectangular wave generator having high impedance when triggered by the negative portion of a rectangular wave and having low impedance when triggered by the positive portion of said rectangular wave, means for connecting the other of said stimuli to cause conductance in said variable impedance means during the positive portion of said rectangular wave, and means connected in circuit with said second stimuli for sensing and integrating the wave resulting from said current flow.

7. In a network delivering an output indication which is a joint function of two input stimuli, a rectangular wave generator developing an electric wave characterized by the absence of any substantial unidirectional component, means responsive to one of said input stimuli for modifying the characteristics of the rectangular output wave of said generator, variable impedance means connected in circuit with the output of said rectangular wave generator having high impedance conductance when triggered by the negative portion of a rectangular wave and having low impedance when triggered by the positive portion of said rectangular wave, means for connecting the other of said stimuli to cause conductance in said variable impedance means during the positive portion of said rectangular wave, means connected in circuit with said second stimuli for sensing and integrating the wave resulting from said current flow, circuit means connecting said integrating means to said variable impedance means for changing the effective signal sensed from the unidirectional current flow in said variable impedance means to an alternating current having similar positive and negative peak values.

8. In a network delivering an output indication which is a joint function of three unidirectional input signal voltages, a rectangular wave generator developing an electric wave characterized by the absence of any substantial unidirectional component, a first of said input voltages connected to vary the frequency of said generator, a second of said input voltages connected to modify the time ratio characteristics of the rectangular output wave of said generator, a transistor switching means having its base and emitter electrodes connected to be energized by the output of said generator and adapted to allow current flow between its emitter and collector electrodes when said base and emitter electrodes are energized by the positive portion of said rectangular wave, means for connecting the third of said voltages to cause current flow in said transistor means curing the positive portion of said rectangular wave, a means connected in circuit with said third voltage for sensing and integrating the wave resulting from said current flow, and circuit means connecting said integrating means to said transistor means for changing the effective signal sensed from the unidirectional current flow in said variable impedance means to an alternating current having similar positive and negative peak values.

9. In a network delivering an output indication which is a joint function of three input stimuli, a rectangular wave generator developing an electric wave characterized by the absence of any substantial unidirectional component, a first of said input stimuli connected to vary the frequency of said generator, a second of said input stimuli connected to modify the time ratio characteristics of the rectangular output wave of said generator, switching means connected with the output of said generator adapted to allow current flow when energized by the positive portion of said rectangular wave, means for connecting the third of said stimuli to cause conductance in said switching means during the positive portion of said rectangular wave whereby a signal is provided which is a function of said first, second and third stimuli, means connected in circuit with said third stimuli for sensing and integrating the wave resulting from said current flow, and circuit means connecting said integrating means to said switching means, means for changing the effective signal sensed from the unidirectional current flow in said variable impedance means to an alternating current having similar positive and negative peak values.

10. An electric network multiplier and divider utilizing voltage stimuli $E_1$, $E_3$ and $E_4$, comprising a relaxation oscillator adapted to produce a rectangular wave output voltage having a frequency proportional to $(4E_1^2-E_3^2)$ and characterized by the absence of any substantial unidirectional component, a transistor having its base electrode and its emitter electrode connected in circuit with the output of said oscillator whereby said transistor is biased to allow current flow from its emitter electrode to its collector electrode only during periods when the potential between said base and emitter is in a sense to promote current flow in said transistor, said periods being proportional to $1/(2E_1 \pm E_3)$, said transistor having its collector electrode and said emitter electrode connected in one leg of a bridge circuit, said stimulus $E_4$ connected across one diagonal of said bridge to cause a current flow therethrough, and an averaging voltmeter connected across the other diagonal of said bridge to measure the resultant voltage $E_3E_4/4E_1$.

11. An electric network multiplier and divider utilizing voltage stimuli $E_1$, $E_3$ and $E_4$, comprising a relaxation oscillator adapted to produce a rectangular wave output voltage having a frequency proportional to $(4E_1^2-E_3^2)$ and characterized by the absence of any substantial unidirectional component, said stimulus $E_3$ connected to modify the time ratio characteristics of the positive and negative output wave of said oscillator, a transistor having its base electrode and its emitter electrode connected in circuit with said output wave whereby said transistor is biased to allow current flow from its emitter electrode to its collector electrode only during periods when the potential between said base and emitter is in a sense to promote current flow in said transistor, said periods being proportional to $1/(2E_1 \pm E_3)$, said transistor having its collector electrode and said emitter electrode connected in one leg of a bridge circuit, said stimulus $E_4$ connected across one diagonal of said bridge to cause a current flow therethrough, and an averaging voltmeter connected across the other diagonal of said bridge to measure the resultant voltage $E_3E_4/4E_1$.

12. A voltage multiplier and divider utilizing voltage signals $E_1$, $E_3$ and $E_4$ comprising a relaxation oscillator adapted to produce a rectangular wave output voltage having a frequency proportional to $(4E_1^2-E_3^2)$, a transistor having its base electrode and its emitter electrode connected in circuit with said oscillator in a sense to promote current flow in said transistor for a period proportional to $1/(2E_1+E_3)$, said transistor having its collector electrode and said emitter electrode connected in one leg of a bridge circuit, the voltage signal $E_4$ connected across one diagonal of said bridge circuit to cause a current flow thereacross and an average voltmeter connected across the other diagonal of said bridge circuit to measure the sense and integrate the imbalance voltage which is equal to $E_3E_4/4E_1$.

13. A voltage multiplier and divider network comprising a saturable transformer provided with a primary winding having a center tap thereon, a voltage divider means having a center voltage tap thereon, a signal voltage $E_1$ connected between said center tap and said voltage tap, a first transistor having its emitter and collector electrodes connected between one end of said winding and one end of said voltage divider for carrying a current therebetween, a second transistor having its emitter and collector electrodes connected between the other end of said primary winding and the other end of said voltage divider for carrying a current therebetween, means for alternately biasing each of said transistors in response to the flux excursion of said transformer whereby each of said transistors alternately completes a circuit between said primary winding and said battery during the periods between positive and negative saturation, connections connecting a voltage $E_3$ across said voltage divider means for varying the relative conductive time of said transistors in response to the magnitude of the voltage $E_3$, a secondary winding on said saturable transformer having a rectangular wave voltage $E_2$, said voltage $E_2$ having a positive half cycle having a time duration proportional to $1/(2E_1 \pm E_3)$ and a frequency proportional to $(4E_1^2-E_3^2)$, a third transistor connected to said voltage $E_2$ in a sense to promote current flow therein when $E_2$ is positive, said third transistor connected in one leg of a Wheatstone bridge circuit, a voltage $E_4$ applied across one diagonal of said bridge, an averaging voltmeter connected across the other diagonal of said bridge to sense and integrate a resultant voltage $E_0$ which is equal to $E_3E_4/4E_2$.

14. A voltage multiplier and divider comprising a saturable transformer provided with a first and a second similar primary winding and a first and a second similar tertiary winding, said primary windings being connected at a common tap, a first transistor having collector electrode connected to said first primary winding and a base and emitter electrode each connected in circuit with said first tertiary winding to be energized thereby, a second similar transistor connected in a similar manner with said second primary and said second tertiary windings, a voltage divider connected between said emitter electrodes of said transistors, first voltage terminals connected between said common tap and a center tap of said voltage divider adapted to receive a signal voltage $E_1$, second voltage terminals connected at the ends of said voltage divider adapted to receive a signal voltage $E_3$ whereby said transformer, said transistors, said voltage divider and said voltages cooperate to provide a relaxation oscillator having a frequency proportional to $(4E_1^2-E_3^2)$, said transformer having wound thereon a secondary winding which is energized by flux excursions thereof to provide an output voltage $E_2$ having half cycle time durations proportional to $1/(2E_1+E_3)$ and $1/(2E_1-E_3)$ respectively, a third transistor having its base and emitter electrodes connected in circuit with said secondary winding in a sense providing a low impedance path between its emitter and collector electrodes during the positive half cycles of said voltage $E_2$, a third signal voltage $E_4$ connected in circuit with said third transistor for providing a potential across its emitter and collector electrodes to cause current flow in said third transistor, means connected in circuit with said third transistor to sense and integrate the current flowing therethrough, and other means for removing the signal $E_4/2$ so that the signal sensed is proportional to $E_3E_4/E_1$.

15. A control circuit for limiting the power output of a generator comprising a rectangular wave oscillator, first circuit means connecting a first unidirectional signal proportional to the voltage of the generator to said oscillator for changing the ratio of the time duration of the positive output voltage to the time duration of the negative output voltage, a switch means connected to said oscillator for allowing current flow therein when said output voltage is positive with respect thereto, second circuit means connecting a second unidirectional signal proportional to load current from the generator to said switch means to cause current flow from said second unidirectional signal through said switch means, means connected in circuit with said second circuit means for removing a portion of said second signal equal to one-half the value thereof thereby to obtain a resultant signal proportional to the product of said voltage and said load circuit of the generator, means connected in circuit with said switch means and said second signal for sensing and integrating the resulting signal, and circuit means connected between said sensing means and the generator for limiting the excitation of the generator in response to a predetermined magnitude of said resultant signal.

16. A network delivering an output indication which is a joint function of three unidirectional input voltage signals for limiting the power output of a generator, comprising a rectangular wave oscillator developing an electric wave characterized by the absence of any substantial unidirectional component, a first of said input voltages derived from the speed of the generator connected to vary the base frequency of said oscillator, a second of said input voltage derived from the voltage of the generator connected to modify the time ratio characteristics of the rectangular output wave of said generator, transistor switching means connected in circuit with the output of said oscillator adapted to allow current flow when energized by the positive portion of said rectangular wave, means for connecting the third of said voltages derived from the load current of the generator to cause current flow in said transistor means, a voltage dividing circuit connected to said transistor means for changing said current flow from the unidirectional current flow to an alternating current having similar positive and negative peak values, means connected to said load means for integrating said current signal and thereby deriving a signal proportional to the voltage of the generator multiplied by the load current of the generator and divided by the speed of the generator.

17. A control system for limiting the power output of a generator comprising, a rectangular wave oscillator developing an electric wave characterized by the absence of any substantial unidirectional component, said oscillator consisting of a saturable transformer having a pair of similar primary windings connected at one end to a common tap, a voltage divider having a center tap, and a pair of transistors adapted to carry current alternately and respectively connected between the ends of said divider and the other ends of said primary windings, a first of said input voltages derived from the speed of the generator connected between said common tap and said center tap to vary the frequency of said oscillator, a second of said input voltage derived from the voltage of the generator connected across said voltage divider to modify the time ratio characteristics of the rectangular output wave of said generator, transistor switching means connected to a secondary winding of said transformer to be energized by the output of said oscillator to allow current flow during the positive portion of said rectangular wave, means for connecting the third of said voltages derived from the load current of the generator to cause current flow in said transistor means, load means connected to said transistor means for changing said current flow from the unidirectional current flow to an alternating current having similar positive and negative peak values, means connected to said load means for integrating said current signal and thereby deriving a resultant signal proportional to the voltage of the generator multiplied by the load current of the generator and divided by the speed of the generator, and means for connecting said resultant signal to said generator to reduce the excitation thereof.

References Cited in the file of this patent
UNITED STATES PATENTS

| | | |
|---|---|---|
| 2,666,885 | Bradley et al. | Jan. 19, 1954 |
| 2,740,086 | Evans et al. | Mar. 27, 1956 |
| 2,760,088 | Pittman et al. | Aug. 21, 1956 |
| 2,783,384 | Bright et al. | Feb. 26, 1957 |